UNITED STATES PATENT OFFICE.

WILLIAM O. EMERY, OF CRAWFORDSVILLE, INDIANA, AND JOSEPH NERKING AND OTTO PAUL, OF BONN, GERMANY; ELLA PAUL, SOLE HEIRESS OF OTTO PAUL, DECEASED.

METHOD OF PREPARING A FOOD PRODUCT.

No. 863,974.

Specification of Letters Patent.

Patented Aug. 20, 1907.

Application filed February 23, 1904. Serial No. 195,322.

*To all whom it may concern:*

Be it known that we, WILLIAM O. EMERY, a citizen of the United States, residing at Crawfordsville, county of Montgomery, State of Indiana, and JOSEPH NERKING, a subject of the Emperor of Germany, residing at Bonn-on-the-Rhine, Germany, and OTTO PAUL, deceased, late a subject of the Emperor of Germany, and residing at Bonn-on-the-Rhine, Germany, have invented a certain new and useful Method of Preparing a Food Product, of which the following is a specification.

This invention relates to a chemically prepared food-product which is especially adapted to be used either alone or a basic material from which pre-digested or partly pre-digested foods may be manufactured, and which material is also adapted for use as an undigested food-product either by itself or in mixtures with other materials.

The especial object of this invention is to provide for the utilization of certain raw materials particularly the compressed or caked materials which are left as a residue in manufacturing peanut oil.

The nutritive value of the compressed materials or cakes which are left as a by-product in the manufacture of cotton-seed oils, linseed oils, or similar products has been recognized by manufacturers for some time past, and although these cake residues have been utilized for feeding cattle and for similar purposes, little effort has been made to utilize such materials in the manufacture of food-products for table or hospital use.

The especial object of our invention is to provide a simple and efficient way of manufacturing wholesome, nutritive food-products for table or hospital uses from the materials left as a residue in manufacturing peanut oil.

We will now describe our method as practiced with respect to this particular material, and will set forth the physical properties of the food-product which may be produced therefrom.

The material which we regard as especially well suited to be utilized according to our method is peanut cake, or the residue which is left in the extraction of peanut oil. An average quality of peanut cake contains about forty per cent of proteids or nutritive nitrogenous material, and by the treatment of peanut cake according to our method, practically all such nitrogenous material may be converted into a wholesome food-product suitable for table or hospital use.

In practicing our invention as applied to peanut cake, the peanut cake suitably powdered is first immersed in a strong brine preferably containing from 12 to 15% of salt, ordinary salt is used, and the bath is maintained at the ordinary temperature, or if desired, may be raised to approximately 100° Fahrenheit. The immersion of the peanut cake in the brine is continued as long as may be necessary to dissolve such nitrogenous materials as are soluble in brine which usually takes about fifteen minutes. We prefer that this should be done in ordinary open vats with agitation, although, if desired, the process may be hastened by solution at higher temperature and under pressure. The insoluble residue from the peanut cake is next filtered out or separated by decantation. The solution is then carefully neutralized or slightly acidulated, preferably with acetic acid or hydro-chloric acid. This preferably is done first by using a solution consisting of about one part of acid to seventy-five parts of water, then using one of about one to thirty, and finally a solution of about one to five. This will cause the precipitation of a material having a flocculent, flaky or curdy appearance, according to the rapidity with which the acid is added and also depending on the strength of acid employed, which, when filtered out and washed and dried under diminished pressure has a coarse granular translucent appearance and is of a light brownish color. It is then milled and bolted and this produces a substance having the appearance of a fine nearly white meal, or flour. From its physical properties this material might readily be mistaken for flour or starch, although, as a matter of fact, it is a nitrogenous material containing little or no starch whatever. This material as thus manufactured may be sold as a food-product direct, which can be prepared for table use by cooking, or which can be disguised and flavored by mixture with other ingredients, It can also be employed as a basic material from which pre-digested or partly pre-digested food-products may be manufactured. For this purpose, the material may be treated either with a solution of natural animal digestive ferments or acids, or with certain plant ferments, as papain, etc., or again with dilute acids or acid salts, which produce similar re-actions to the natural digestive juices.

We are aware that changes may be made in practicing our invention by those who are skilled in the art, without departing from the spirit of the invention as expressed in the claims. For example, instead of using peanut cake in practicing our invention, any vegetable materials containing the same proteids as peanut cake may be used, as for example, cotton-seed and linseed press cake, etc., after such materials have been freed from their coloring and odoriferous contents. We do not wish, therefore, to be limited to the exact process or product we have herein described, but What we do claim and desire to secure by Lteters Patent of the United States is:—

1. The process of preparing a food-product from the residual caked material left by extraction of peanut oil, which consists first in dissolving soluble proteids of said peanut oil cake in strong salt brine, separating the solution from the insoluble matters, and then precipitating the desired product in the form of a granular precipitate by adding acid to the solution.

2. The process of preparing food products from material containing substantially the proteids which are contained in peanut press cake and substantially free from deleterious coloring and odoriferous matters, which consists first in dissolving the soluble proteids of said material in strong salt brine, separating the solution, and then adding acid to the solution and thereby obtaining a granular precipitate therefrom.

3. The process of preparing food products from material containing substantially the proteids which are contained in peanut press cake, and substantially free from deleterious coloring and odoriferous matters, which consists first in dissolving the soluble proteids of said material in a brine containing about 13% of salt, then separating the solution, and finally by means substantially as described obtaining a precipitate therefrom.

In testimony whereof we have set our hands in the presence of two subscribing witnesses.

WILLIAM O. EMERY.
JOSEPH NERKING.
OTTO PAUL.

Witnesses to the signature of William O. Emery:
H. H. PASTINE,
JAMES G. WEDDING.

Witnesses to the signatures of Joseph Nerking and Otto Paul:
PETER FOSS BAUMGARTON.
PETER FELTON.